G. J. LA VIGNE.
TIRE CHAIN RETAINER.
APPLICATION FILED APR. 6, 1922.
1,421,966.
Patented July 4, 1922.
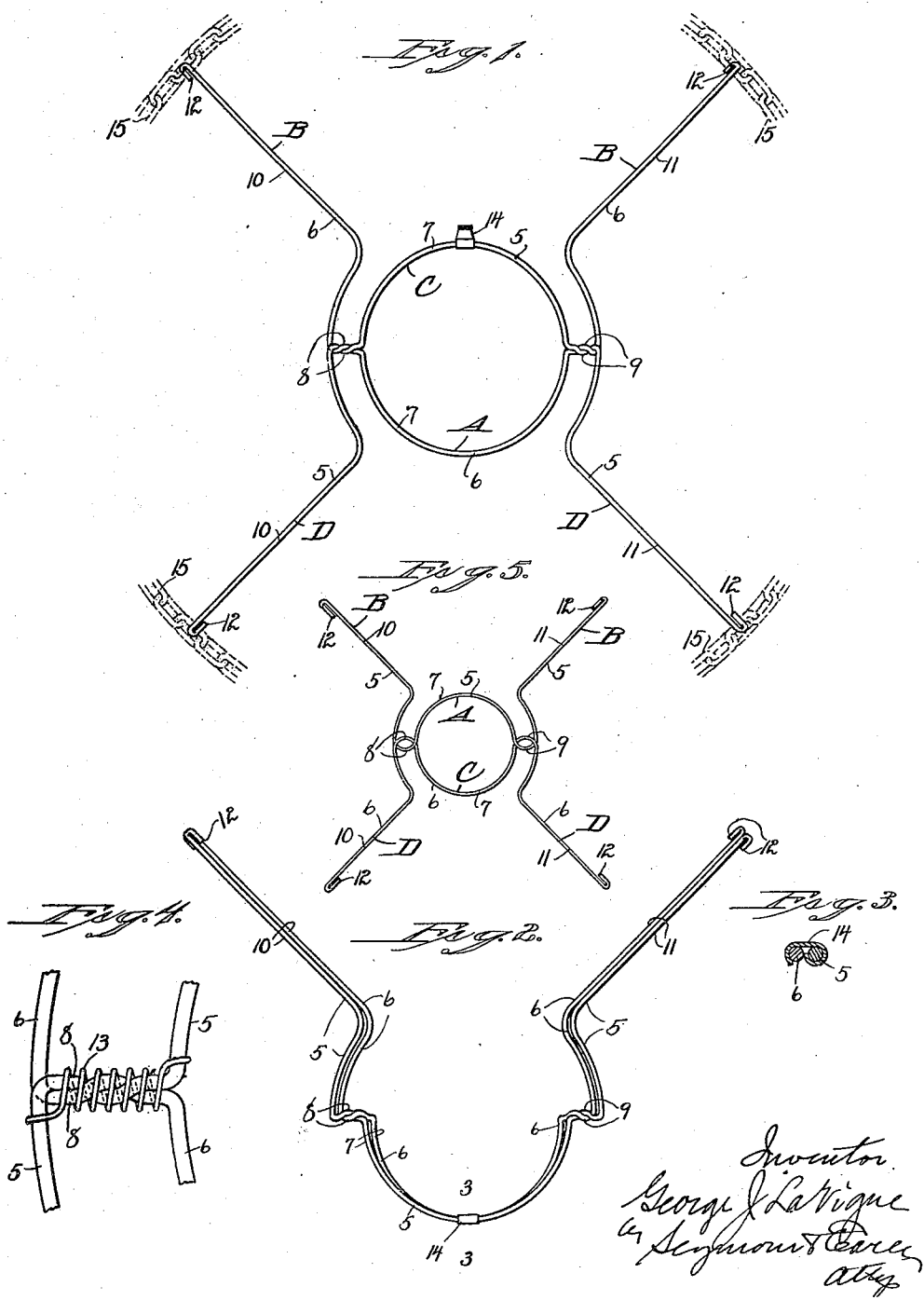

UNITED STATES PATENT OFFICE.

GEORGE J. LA VIGNE, OF NEW HAVEN, CONNECTICUT.

TIRE-CHAIN RETAINER.

1,421,966.  Specification of Letters Patent.  Patented July 4, 1922.

Application filed April 6, 1922. Serial No. 550,202.

*To all whom it may concern:*

Be it known that I, GEORGE J. LA VIGNE, a citizen of the United States, residing at New Haven, in the county of New Haven and State of Connecticut, have invented a new and useful Improvement in Tire-Chain Retainers; and I do hereby declare the following, when taken in connection with the accompanying drawings and the characters of reference marked thereon, to be a full, clear, and exact description of the same, and which said drawings constitute part of this application, and represent, in—

Fig. 1 a side view of a tire chain retainer constructed in accordance with my invention, and indicated as connected with a tire chain.

Fig. 2 a side view of the same, disengaged from the chain and shown in the folded position.

Fig. 3 a sectional view on the line 3—3 of Fig. 2.

Fig. 4 an enlarged view, showing the device in connection with a spring for holding the members in their open position.

Fig. 5 a side view of a modified form of my invention, on a reduced scale.

This invention relates to improvement in tire chain retainers, that is, devices adapted to hold tire chains in position upon a tire, the object of the invention being to construct a device for this purpose from two pieces of wire which may be easily applied and, when in place, will retain their position, and which, on account of their relative rigidity, are always ready for use, and the invention consists in the construction as hereinafter described and particularly recited in the claims.

In carrying out my invention, I employ two wires 5 and 6. Each of these wires is formed at the center with a semi-circular bend 7, from which the wires are offset to form bearings 8 and 9, and thence radially to provide arms 10 and 11 which stand at substantially an angle of 90° and terminate in hooks 12. Preferably, and as shown in Figs. 1, 2 and 4, the bearings 8 and 9 will be interlocked by twisting. If desired, and as shown in Fig. 4 of the drawings, a coil spring 13 may surround the bearings, so as to normally hold the arms in an extended position. Fixed to one of the centers is a clip 14 adapted, when the members are folded together, to engage with the other member 6, so as to interlock them, as shown in Fig. 2 of the drawings. If the bearings are not twisted, as shown in Fig. 5 of the drawings, the semi-circular bends 7 will be reversed in position from that shown in Fig. 1, but the result will be exactly the same, except that the members may be separated when not in use. In this connection it will be noted that in Fig. 1, the downward bend A is integral with the arms B, while the upward bend C is integral with the arms D, whereas, in Fig. 5, the upward bend A, although integral with the arms B, is bent in the reversed direction from that shown in Fig. 1, and the downward bend C is integral with the arms D,—that is to say, each member consists of a centrally-bent portion and arms, but the centrally-bent portions may be reversed in position, as shown in Figs. 1 and 5. The hooks 12 engage with the usual tire chains 15 on opposite sides of the wheel, and the arms 10 and 11 have sufficient spring, due to the loops 8 and 9, to place the necessary tension on the chain to hold it in place, the bends 5 and 6 giving clearance for the hub of the wheel.

I claim:

1. A tire chain retainer, comprising two members formed from wire, and each including a semi-circular central section, bearings and radially-extending arms, the bearings of one member adapted to engage with the bearings of the other member, and the arms adapted to engage with a tire chain.

2. A tire chain retainer, comprising two members formed from wire, each having a semi-circular bend at the center, beyond which the ends of the wires are formed with bearings and with radial arms, the bearings interlocked with each other and a clip applied to one member and adapted to engage with the other member when the members are in a closed position.

3. A tire chain retainer, comprising two members, each formed from a single piece of wire and each having a semi-circular bend at the center, from which the ends of the wires are offset and extended radially, the said offset portions engaged with each other, a spring surrounding the engaging portions and tending to hold the members in an open position.

In testimony whereof, I have signed this specification in the presence of two subscribing witnesses.

GEORGE J. LA VIGNE.

Witnesses:
FREDERIC C. EARLE,
MALCOLM P. NICHOLS.